Figures 1, 2:
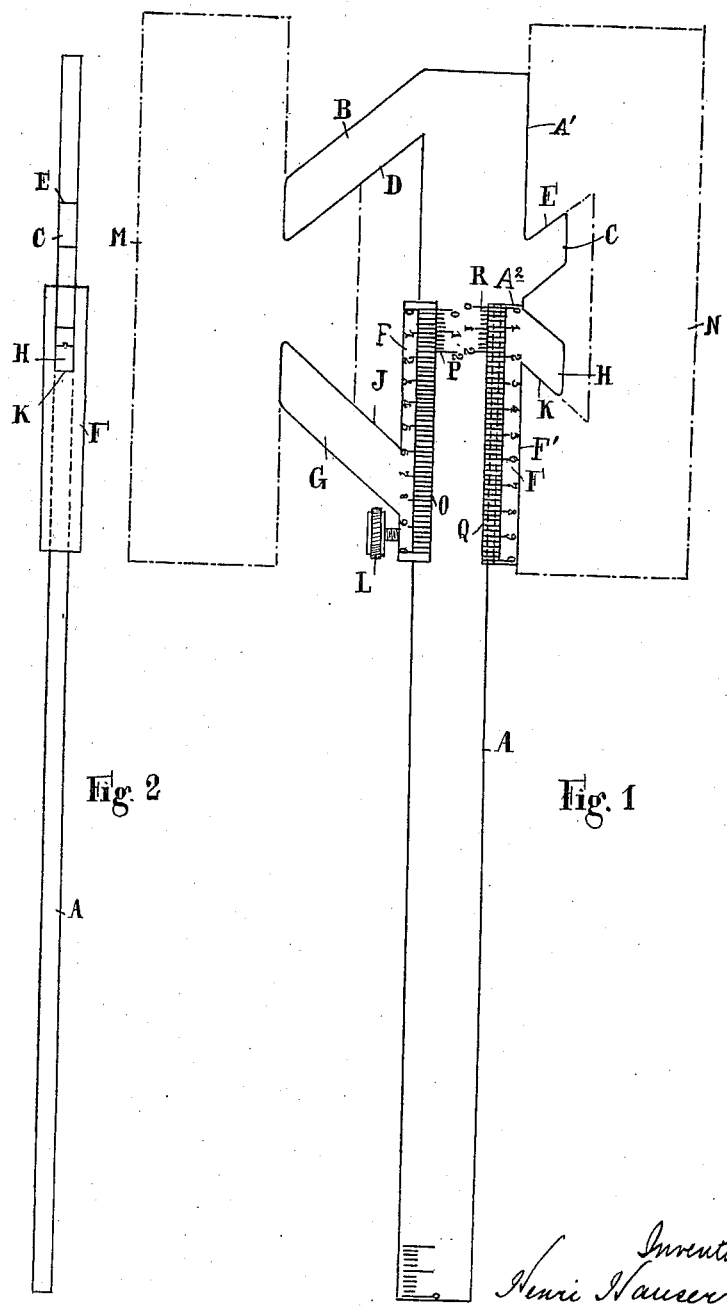

H. HAUSER.
VERNIER CALIPERS.
APPLICATION FILED JAN. 28, 1910.

1,002,149.

Patented Aug. 29, 1911.

UNITED STATES PATENT OFFICE.

HENRI HAUSER, OF MADRETSCH, NEAR BIEL, SWITZERLAND.

VERNIER-CALIPERS.

1,002,149.      Specification of Letters Patent.      Patented Aug. 29, 1911.

Application filed January 28, 1910. Serial No. 540,595.

*To all whom it may concern:*

Be it known that I, HENRI HAUSER, a citizen of the Swiss Republic, and resident of Madretsch, near Biel, Switzerland, have invented certain new and useful Improvements in and Relating to Vernier-Calipers, of which the following is a specification.

This invention relates to calipers and more especially to vernier calipers, the object being to provide a caliper of this kind which will provide for measuring commodiously, exactly and simultaneously both outer surfaces of a dove-tailed sliding member and of both inner surfaces associated with this sliding member.

The accompanying drawing, given by way of example shows one form of embodiment of this invention and in this drawing:

Figure 1 is a side elevation view of the vernier caliper of which Fig. 2 is a top plan view.

The metal rod A provided with the scales P and R, carries on its opposite edges, the branches C and B, respectively. The edge E of the former and the edge D of the latter form a determined angle (in the present case an angle of 40°) with the metal rod A. The latter is preferably of a flat, rectilinear and elongated formation, the broader flat surface of which is most prominent in Fig. 1, and one of its lateral surfaces, which will hereinafter be called edges, being most prominent in Fig. 2. One edge of the rod A has a relatively wide portion A' which carries the branch C and has a shoulder A² adjacent to the base of said branch. This widened portion has an edge portion A' which is parallel with the other longitudinal edges of the rod. This rod carries a sliding member F adapted to be moved thereon to and fro. This sliding member carries on its opposite lateral edges the branches H and G, respectively. The edge which carries the branch H is in alinement with the edge A'. The edge K of the former and the edge J of the latter form the same angle with the metal rod A (in the present instance 40°) as the branches B and C but in a direction which is opposite to that of the latter. By tightening a screw L provided with a head and engaging a correspondingly tapped hole in the sliding member F, one may prevent the latter from being moved on the metal rod A. The scale P of the rod A is intended to allow the reading of the outer measure of a dove-tailed tenon M which is embraced by the branches B and G and conforms to the edges D and J. This scale P also provides for reading the inner measure of a dove-tailed guide N which conforms to the edges E and K of said branches C and H. If it is desired that the tenon shall fit snugly within the said guide one adjustment of the gage is sufficient for measuring both the tenon and the guide therefor. In all the adjustments of the members A and F, the outside measurements of the members E and K will be the same as the inside measurements of the members B and G.

The scale R of the rod A is designed for use in wooden patterns, allowance being made for shrinkage of the metal of the casting, as in cooling. The measurements are read on that line of the scales P and R opposite the zero point of the scales O and Q of the movable member. In order to allow of the exact reading of fractions of the intervals between the divisions of the scales P and R, when it occurs that the zero lines do not exactly register with the device of said scale, use is made of the verniers P and R of the usual type.

I claim:

1. In a vernier caliper a rod having parallel surfaces and edges, said rod being provided with a scale, one end of said rod being wider than the other end, and an angularly disposed branch on the relatively wide portion, and a shoulder adjacent to the base of the branch, and an oppositely disposed branch on the opposite edge of the enlarged portion and longer than the first mentioned branch, a slidable member on said rod adapted to abut against said shoulder, adjacent to the base of the first mentioned branch, the said slidable member being provided with a scale thereon, and adapted to register with the first mentioned scale and having an edge in alinement with one edge of the rod and carrying a branch on said edge, said branch extending in the opposite direction from the first mentioned branch, and an oppositely disposed branch on the opposite edge of the slidable member, said branch being longer than the third mentioned branch.

2. In a vernier caliper, an elongated rod having flat surfaces and edges, a relatively wide portion provided on one end of said rod, a branch adjacent to and forming an angle with one edge of said relatively wide portion, said branch having a shoulder adjacent to the base of the branch, a second branch adjacent to and forming an angle with the opposite edge of said relatively wide portion, a slidable member on said rod adapted to abut against said shoulder, a branch adjacent to and forming an angle with each of the opposite edges, the branches on one side of said calipers adapted to measure the outer surfaces of the dove-tail male member at the same time the branches on the other side measure the inner surfaces of the dove-tail female member, a scale on the rod and a scale on the slidable member.

In testimony whereof I have hereunto set my hand in presence of two witnesses.

HENRI HAUSER.

Witnesses:
FRIEDRICH SCHWOÖER,
CHRISTIAN SOMMER.

Copies of this patent may be obtained for five cents each, by addressing the "Commissioner of Patents, Washington, D. C."